US009462671B2

(12) United States Patent
Reinke et al.

(10) Patent No.: US 9,462,671 B2
(45) Date of Patent: Oct. 4, 2016

(54) ELECTRODE STRUCTURE FOR PLASMA CUTTING TORCHES

(71) Applicant: Kjellberg-Stiftung, Finsterwalde (DE)

(72) Inventors: Ralf-Peter Reinke, Finsterwalde (DE); Frank Laurisch, Finsterwalde (DE); Volker Krink, Finsterwalde (DE)

(73) Assignee: KJELLBERG-STIFTUNG, Finsterwalde (DE)

( * ) Notice: Subject to any disclaimer, the term of this patent is extended or adjusted under 35 U.S.C. 154(b) by 27 days.

(21) Appl. No.: 14/482,159

(22) Filed: Sep. 10, 2014

(65) Prior Publication Data

US 2015/0076123 A1 Mar. 19, 2015

(30) Foreign Application Priority Data

Sep. 13, 2013 (EP) .................................... 13184321

(51) Int. Cl.
*B23K 10/00* (2006.01)
*H05H 1/34* (2006.01)

(52) U.S. Cl.
CPC ........ *H05H 1/34* (2013.01); *H05H 2001/3442* (2013.01)

(58) Field of Classification Search
CPC .. H05H 1/34; H05H 2001/3442; H05H 1/26; B23K 10/00; B23K 9/24
USPC .................. 219/119, 121.52, 121.48, 74, 75; 313/231.41; 315/111.21
See application file for complete search history.

(56) References Cited

U.S. PATENT DOCUMENTS

| | | | | |
|---|---|---|---|---|
| 4,800,281 A * | 1/1989 | Williamson | H01J 27/04 | 250/423 R |
| 4,954,751 A * | 9/1990 | Kaufman | H01J 27/16 | 313/231.31 |
| 5,097,111 A * | 3/1992 | Severance, Jr. | H05H 1/34 | 219/119 |
| 5,105,061 A | 4/1992 | Blankenship | | |
| 5,464,962 A * | 11/1995 | Luo | H05H 1/34 | 219/119 |
| 5,767,478 A | 6/1998 | Walters | | |
| 6,323,586 B1 * | 11/2001 | Zhurin | F03H 1/00 | 313/156 |
| 6,362,450 B1 * | 3/2002 | Severance, Jr. | H05H 1/34 | 219/121.5 |
| 6,841,754 B2 * | 1/2005 | Cook | H05H 1/34 | 219/121.48 |
| 8,656,577 B2 * | 2/2014 | Hussary | H05H 1/28 | 219/121.52 |

FOREIGN PATENT DOCUMENTS

EP 0242023 10/1987

* cited by examiner

*Primary Examiner* — Mark Paschall
(74) *Attorney, Agent, or Firm* — Jacobson Holman, PLLC.

(57) ABSTRACT

The invention relates to an electrode structure for plasma cutting torches, wherein a recess or borehole open at one side in the direction of a workpiece to be processed is formed in an electrode holder or in a holding element for receiving an emission insert, in which recess or borehole the inserted emission insert can be fastened in a force transmitting manner, in a shape-matching manner and/or with material continuity. At least one pressure equalization passage and/or an at least temporarily active pressure equalization passage is present between a hollow space formed in a recess or borehole and the emission insert and the environment through the emission insert and/or between an outer jacket surface region of the emission insert and the inner wall of the recess or borehole, which is formed in the holding element or in the electrode holder (7.1).

10 Claims, 14 Drawing Sheets

Figure 1:
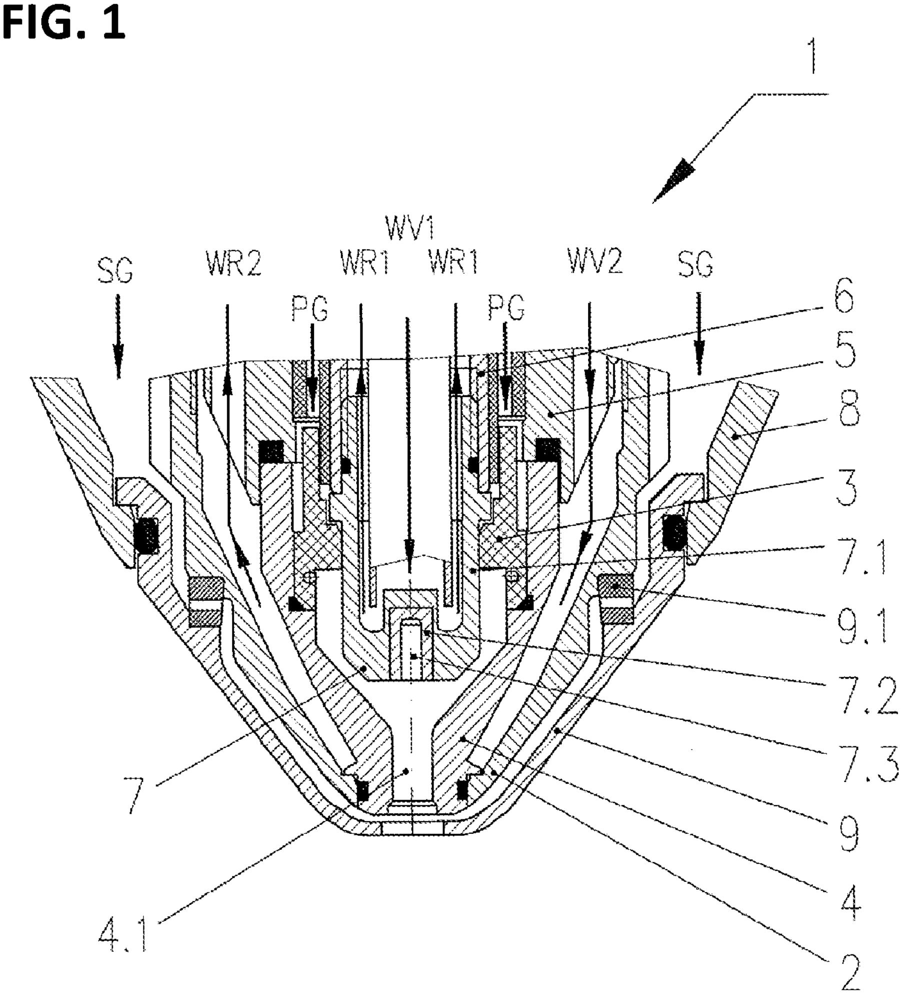

FIG. 2.1
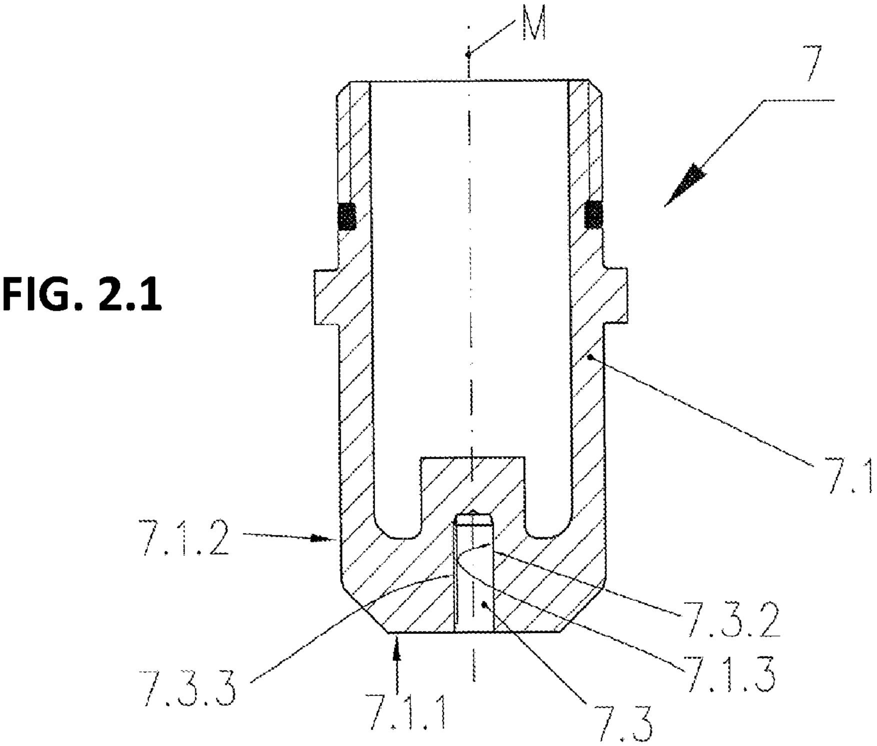
FIG. 2.2
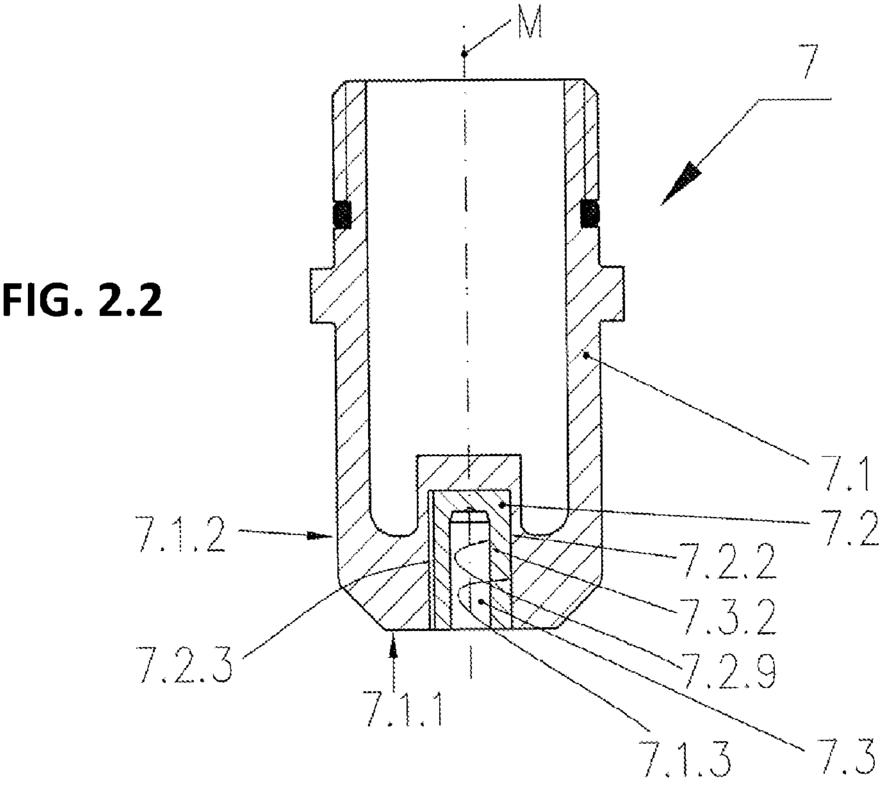

FIG. 2.3
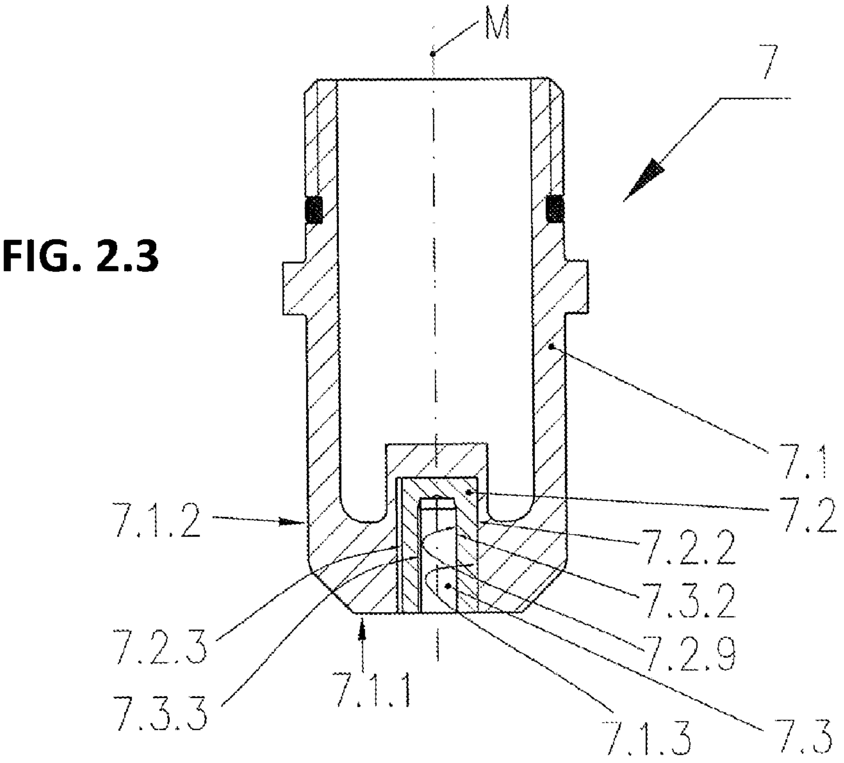
FIG. 2.4
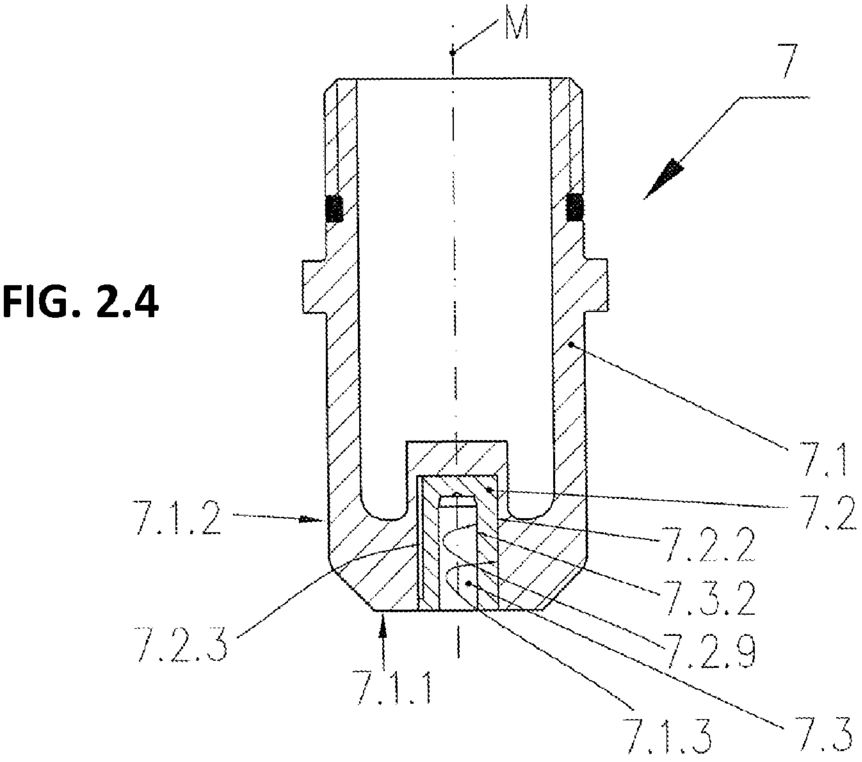

FIG. 3.1
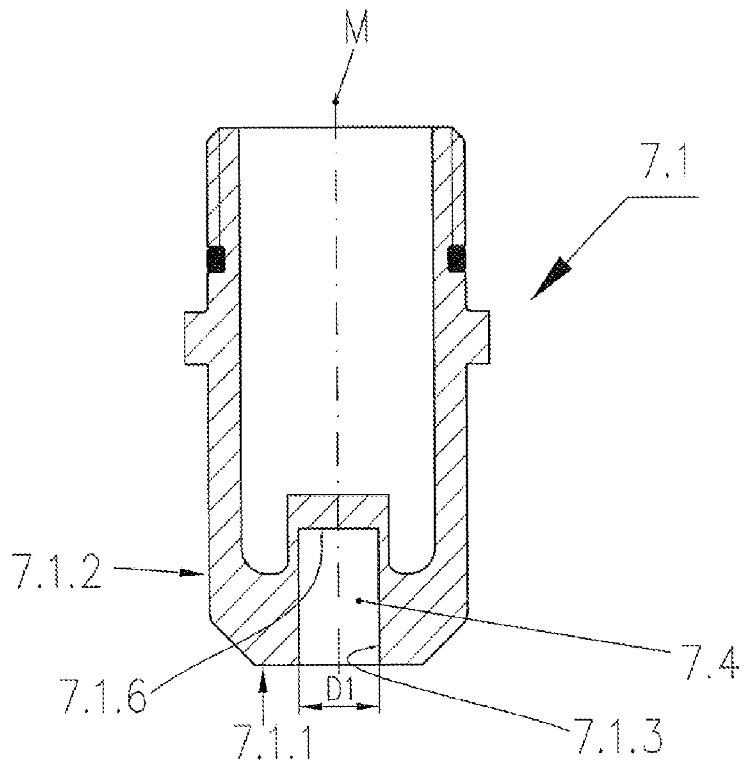
FIG. 3.2
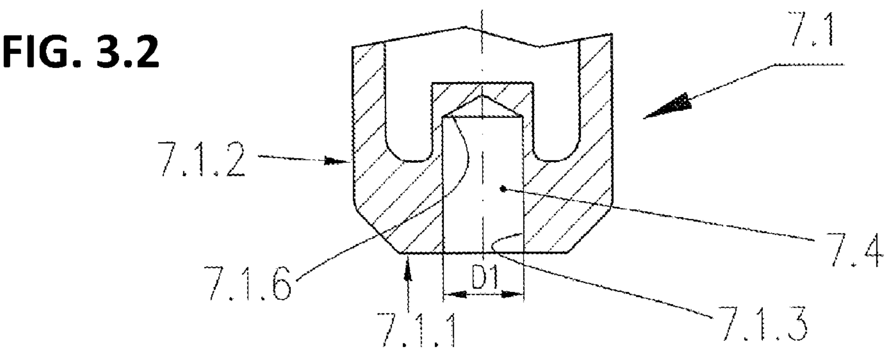
FIG. 3.3
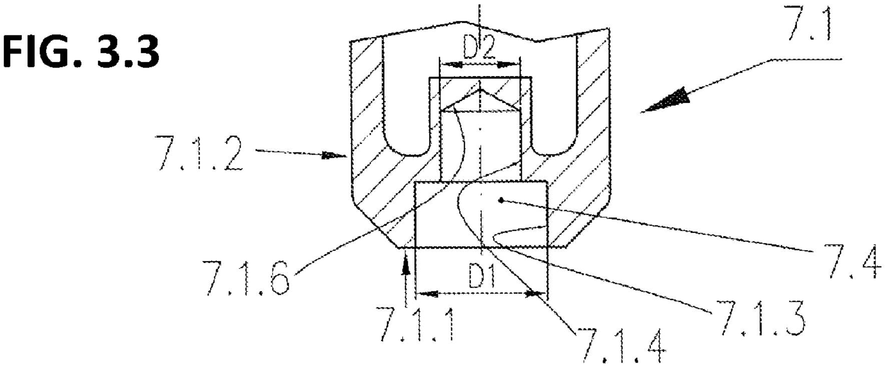

FIG. 4.1
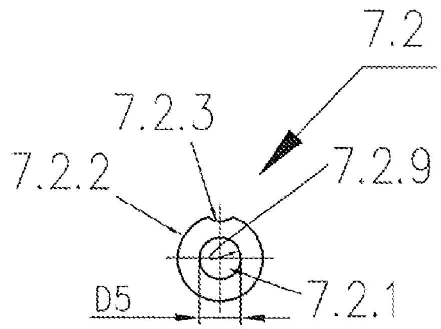
FIG. 4.2
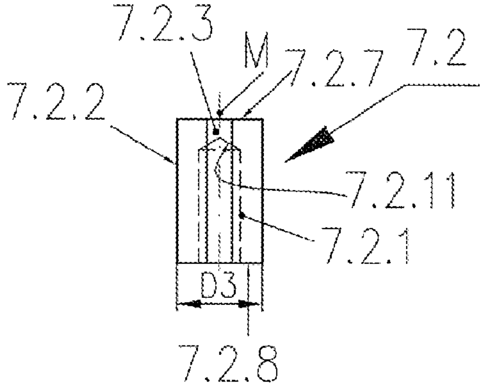
FIG. 4.3
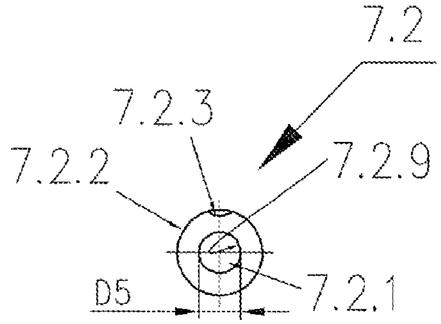
FIG. 4.4
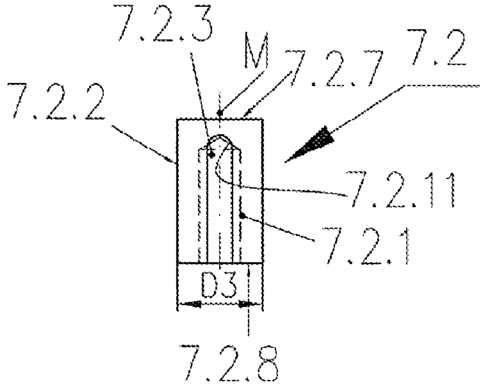

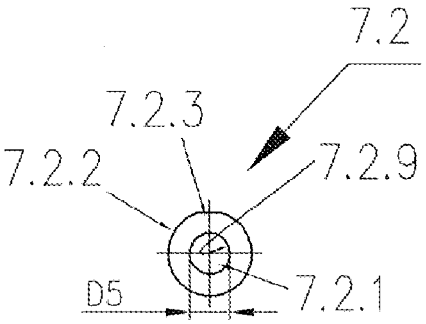
FIG. 5.1
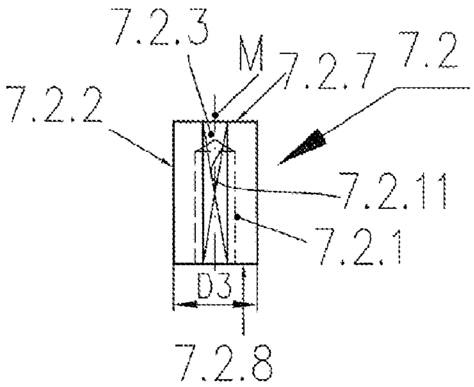
FIG. 5.2
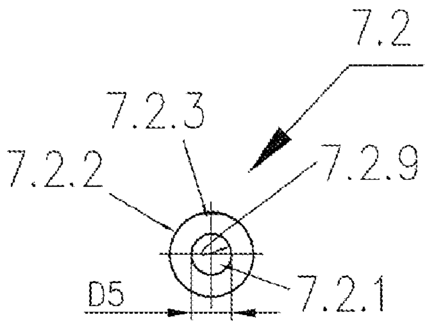
FIG. 5.3
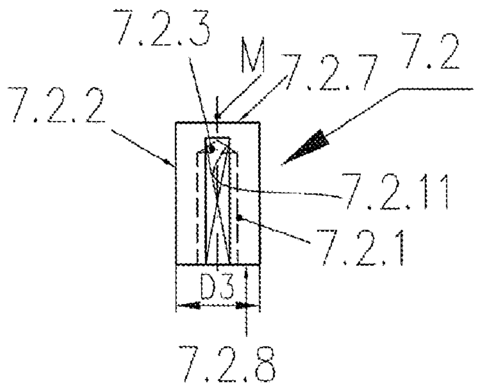
FIG. 5.4

FIG. 6.1
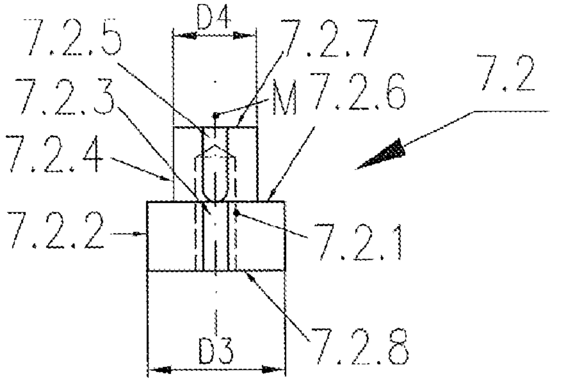
FIG. 6.2
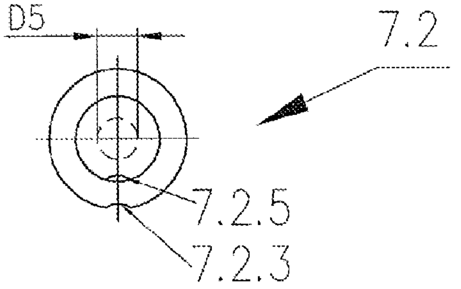
FIG. 6.3
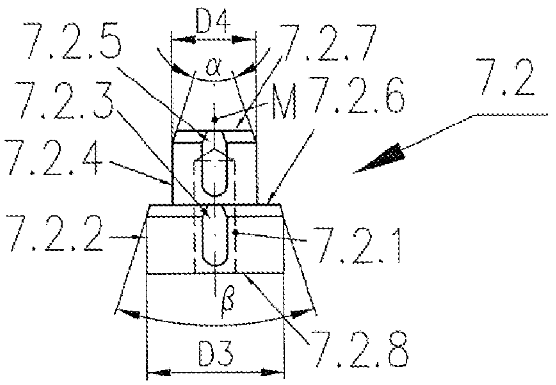
FIG. 6.4
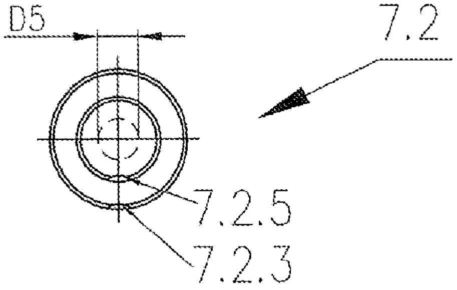

FIG. 7.1
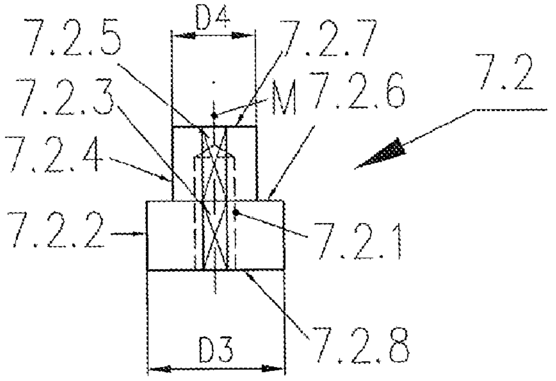
FIG. 7.2
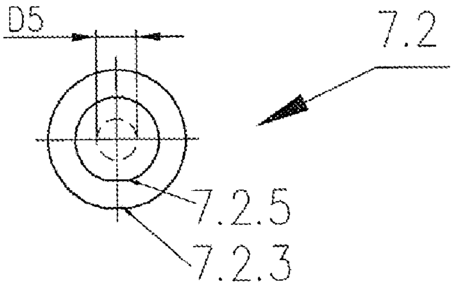
FIG. 7.3
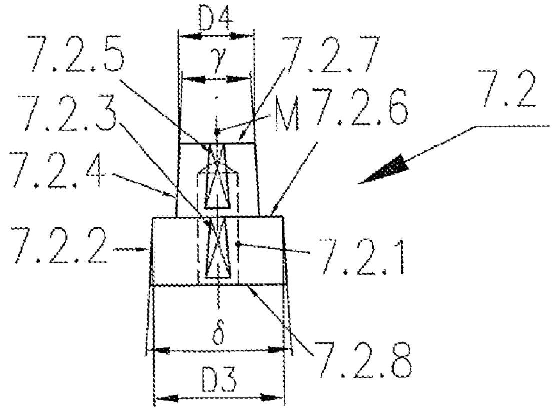
FIG. 7.4
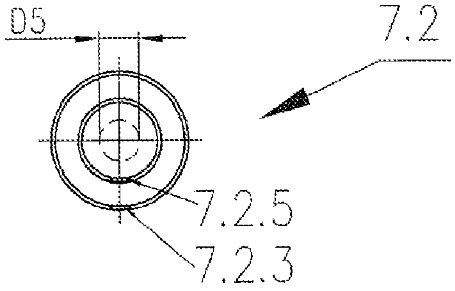

FIG. 8.1
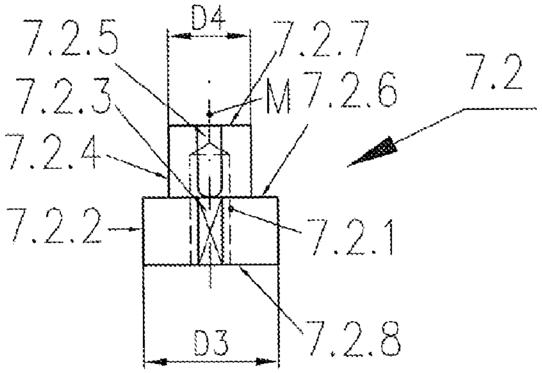
FIG. 8.2
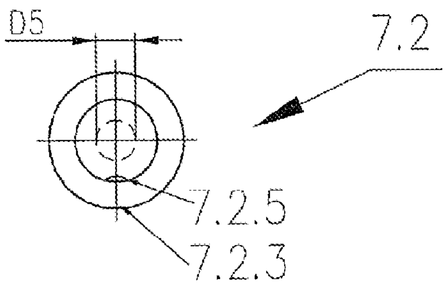
FIG. 8.3
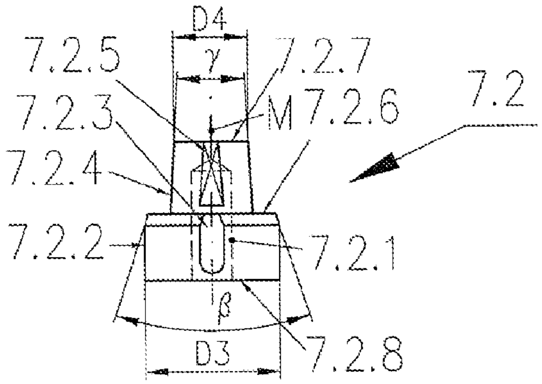
FIG. 8.4
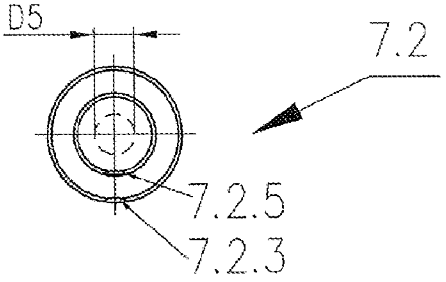

FIG. 9.1
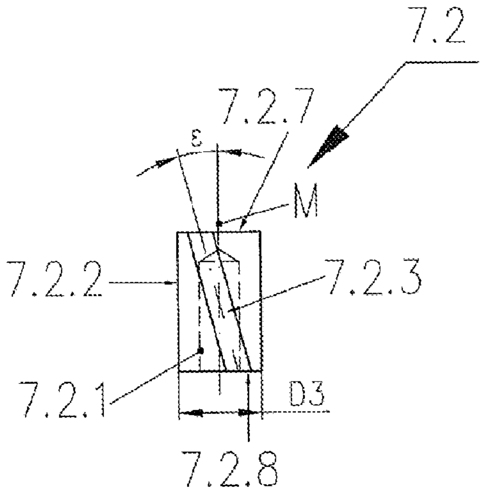
FIG. 9.2
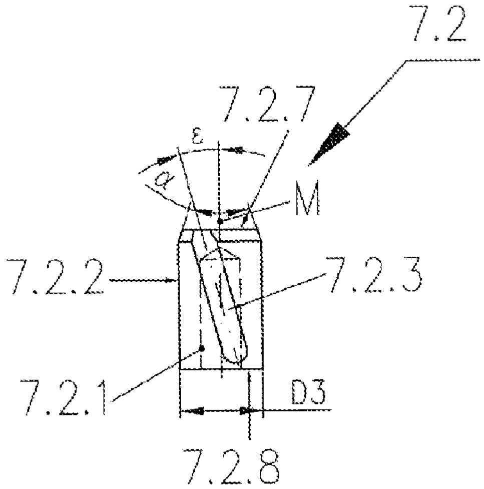

FIG. 10.1
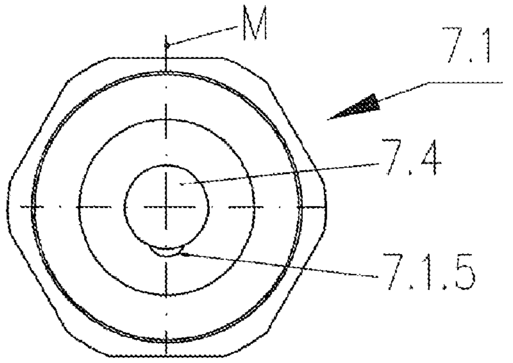
FIG. 10.2
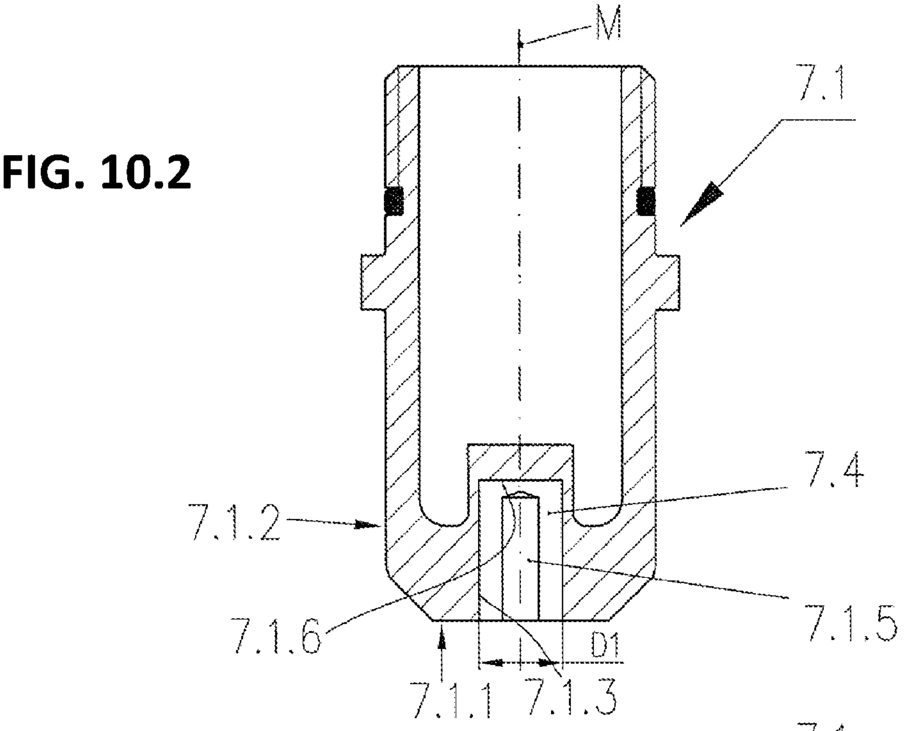
FIG. 10.3
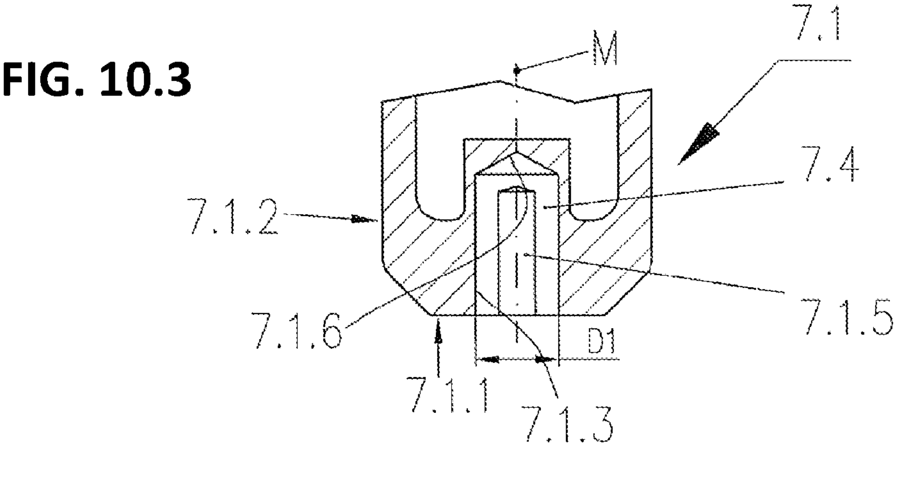

FIG. 11.1
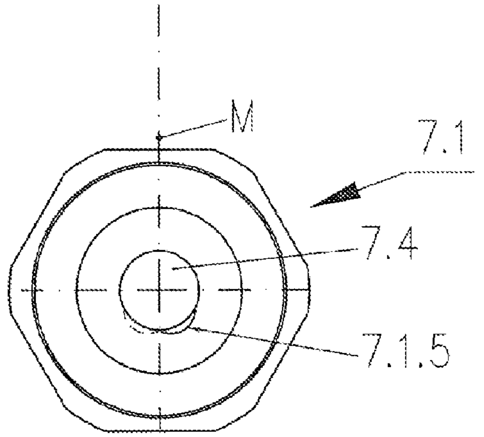
FIG. 11.2
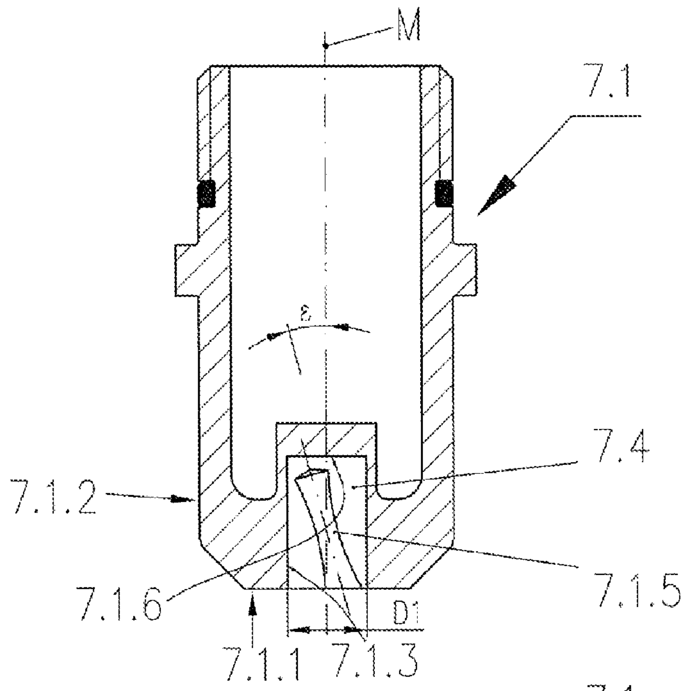
FIG. 11.3
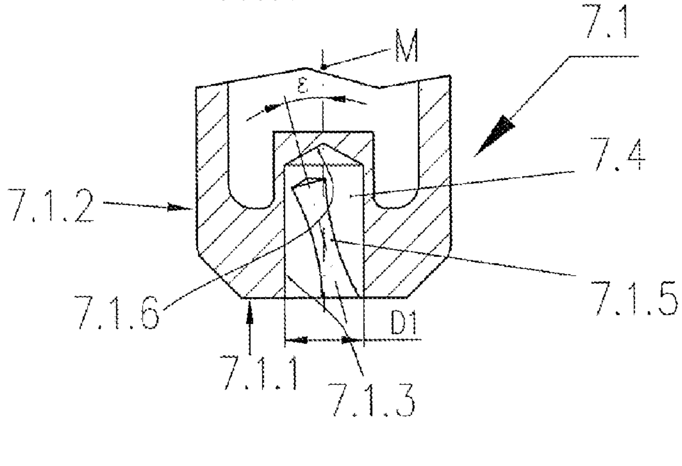

FIG. 12.1
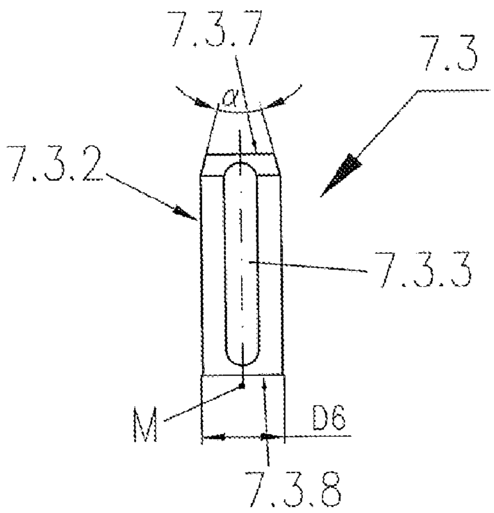
FIG. 12.2
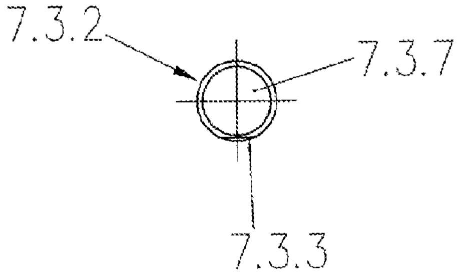
FIG. 12.3
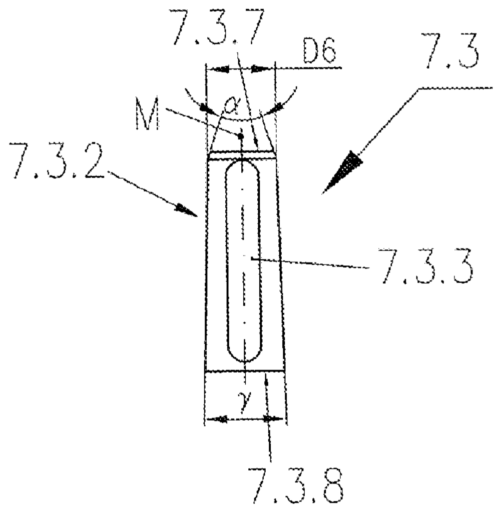

FIG. 13.1
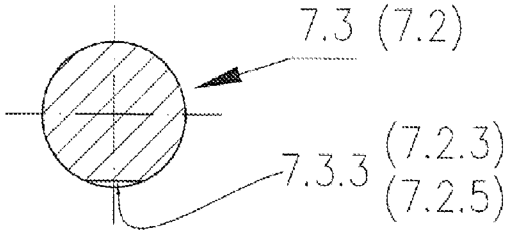
FIG. 13.2
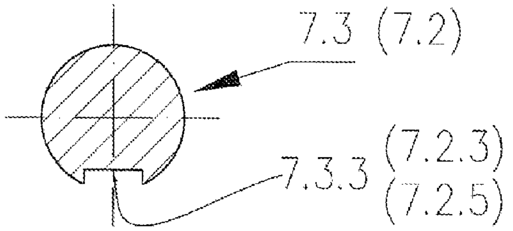
FIG. 13.3
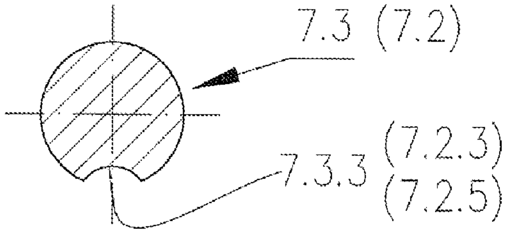
FIG. 13.4
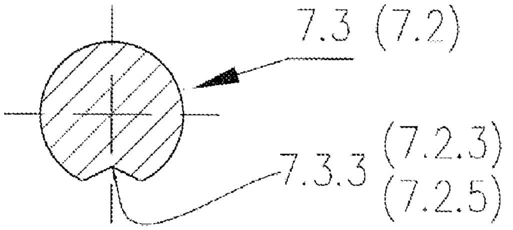
FIG. 13.5
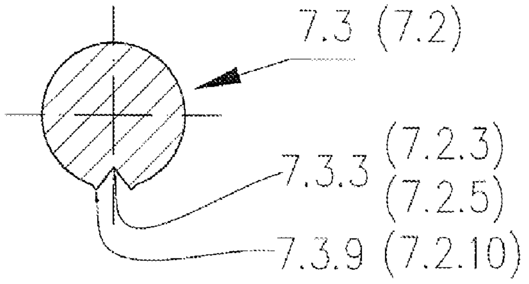

ELECTRODE STRUCTURE FOR PLASMA CUTTING TORCHES

The invention relates to an electrode structure for plasma cutting torches.

A plasma is a thermally highly heated electrically conductive gas which is composed of positive and negative ions, electrons and excited and neutral atoms and molecules.

Various gases, e.g. monatomic argon and/or the diatomic gases hydrogen, nitrogen, oxygen or air are used as a plasma gas. These gases ionize and dissociate by the energy of the plasma arc.

The parameters of the plasma jet can be highly influenced by the design of the nozzle and of the electrode. These parameters of the plasma jet are e.g. the jet diameter, the temperature, the energy density and the flow speed of the gas.

In plasma cutting, the plasma is usually constricted by a nozzle which may be gas-cooled or water-cooled. Energy densities of up to $2\times10^6$ W/cm$^2$ can thereby be achieved. Temperatures arise in the plasma jet of up to 30,000° C. which allow very high cutting speeds on all electrically conductive materials in combination with the high flow speed of the gas.

A plasma torch substantially comprises a plasma torch head 1, an electrode 7 and a nozzle 4; further components can be an electrode mount 6 for fixing the electrode 7 and the nozzle holder 5 as well as a nozzle cap 2 for fixing the nozzle 4. The plasma gas PG is supplied into the space between the electrode 7 and the nozzle 4 through the plasma gas conduit 3 and ultimately flows through the nozzle borehole 4.1 through the nozzle 4.

Modern plasma torches additionally have a protective nozzle cap 9 and a secondary gas guide 9.1 via which a secondary gas SG is supplied to the plasma jet. The nozzle 4 and the electrode 7 are frequently cooled with a liquid coolant, e.g. water.

Plasma cutting is today an established process for cutting electrically conductive materials, with different gases and gas mixtures being used in dependence on the cutting work.

Different electrodes 7 and nozzles 4 are then used for this purpose. They are subject to wear during the operation of the plasma torch and then have to be replaced. To be able to use a plasma torch for different gases or gas mixtures, the plasma torches, electrodes 7 and nozzles 4 are designed so that a plasma torch can be used for different gases by the replacement of the electrodes 7 and nozzles 4.

Electrodes 7 as a rule comprise an electrode holder 7.1 and an emission insert 7.3. It is generally possible to distinguish between two design forms. When cutting with plasma gases containing oxygen, a so-called flat electrode is used as a rule, i.e. the emission insert 7.3 is located—with the exception of its front emission surface—in the electrode holder 7.1. The emission insert 7.3 comprises hafnium or zirconium. Materials which have good current conductivity and thermal conductivity such as e.g. copper or silver are used for electrode holders 7.1. In electrodes 7 for cutting with gases or gas mixtures not containing oxygen, e.g. argon, hydrogen, nitrogen, tungsten is used, often with doping amounts (e.g. of lanthanum), as the material for the emission insert 7.3. It is then fastened in the electrode holder 7.1, but, in contrast to the flat electrode, projects out of it and is often called a point electrode.

There are also embodiments in which an emission insert 7.3 is connected to an additional holding element 7.2 and in which the holding element 7.2 is in turn connected to the electrode holder 7.1.

The electrode holder 7.1 can thus be manufactured from copper, a holding element 7.2 from silver and the emission insert 7.3 from hafnium, zirconium or tungsten. Different alloys of copper and silver are naturally also possible for the electrode holder 7.1 and the holding element 7.2. The electrode holder 7.1 and the holding element 7.2 can also comprise the same material.

The connection of the electrode holder 7.1 and of the emission insert 7.3 or the connection between the electrode holder 7.1 and the holding element 7.2 and/or the emission insert 7.3 is achieved in a force-transmitting manner, in a shape-matched manner and/or with material continuity.

In this respect, it is important with respect to the connection that it can be maintained permanently during operation, with a good thermal and electrically conductive connection, which is as homogeneous as possible, being maintained and remaining.

As a rule, emission inserts 7.3 are inserted into a borehole or into a different form of recess which is formed in an electrode holder 7.1 or in a holding element 7.2 and are then fastened therein by a brazing or welding connection with material continuity, with force transmission by means of a press fit or with shape matching, for example by means of a thread.

Analogously a connection can also be achieved between the electrode holder 7.1 and the holding element 7.2.

For good reasons, in this respect, the boreholes or other recess forms are only open at one side so that an emission insert 7.3 or a holding element 7.2 can be introduced into the opening. A borehole can, for example, be configured as a blind borehole. At least partly conically formed recesses can, however, also be used for the reception of the emission insert 7.3 or of a holding element 7.2. Rotationally symmetrical cross-sectional shapes also do not necessarily have to be used.

The outer jacket surface and the dimensioning of the emission insert 7.3 or of the holding element 7.2 are adapted in complementary form to the geometry and dimensioning of a borehole or of another recess.

The parts or the faces of these parts disposed opposite one another after the joining together typically have very tight tolerances with respect to one another since the thermal conduction between the joined parts has to be very good. The spacing between the oppositely disposed faces is negative (i.e. the inner diameter is smaller than the outer diameter, e.g. −0.1 mm) up to "0".

In this respect, there is the problem with the parts joined together in this way that a hollow space filled with air is formed in a borehole or in a differently shaped recess. However, said hollow space is closed in a gas-tight manner with respect to the environment by the very exact type of the join. After the joining, an excess pressure can occur in the interior of the hollow space due to the contained air as a result of a temperature increase during the operation of a plasma cutting torch, the electrode structure is substantially heated on the operation of the plasma cutting torch, the air expands and the pressure is increased accordingly. The join connection can thereby be locally undefined in an unwanted form or can be completely released in the worst case. There is even the possibility of danger due to correspondingly released parts which are moved out of the join compound at a high acceleration. This problem becomes more critical on a longer operation and with increasing wear since the oppositely disposed faces of the joined parts become smaller due to the burn back of the emission insert, but also of the second holding element as a result of material removal.

A further problem can occur due to moisture contained in a hollow space. Corrosion or cavitation can thereby also occur. The join connection, the thermal conductivity and/or the electrical conductivity can likewise be negatively influenced by the material removal correspondingly caused thereby.

It is therefore the object of the invention to provide an electrode structure for plasma cutting torches in which the safety and the operating safety can be observed over at least a longer operating time period with good thermal and electrical conductivity with mutually joined electrode holder and emission insert and optionally an additional holding element.

In accordance with the invention, this object is achieved by an electrode structure having the features of claim 1. Advantageous embodiments and further developments can be realized using features designated in the subordinate claims.

In the electrode structure in accordance with the invention for plasma cutting torches, a recess or a borehole which is open at one side in the direction of a workpiece to be processed is formed in an electrode holder or in a holding element for receiving an emission insert. The inserted emission insert can be fastened in the borehole or the recess in a force-transmitting manner, in a shape matching manner and/or with material continuity.

At least one pressure equalization passage is present between a hollow space formed in a recess or in a borehole and the emission insert and the environment through the emission insert and/or between an outer jacket surface region of the emission insert and the inner wall of the recess or borehole which is formed in the holding element or in the electrode holder.

In an analog manner, at least one pressure equalization passage can also be present between a hollow space formed in a recess or borehole and the holding element and the environment through the holding element and/or between an outer jacket surface region of the holding element and the inner wall of the recess or borehole which is formed in the electrode element or in the holding element.

A pressure equalization passage can be formed as a bore, a groove or a flattened portion at an outer jacket surface. A borehole can be led through a holding element or through the emission insert. A groove can be formed at an inner wall of the electrode holder and/or of the holding element at the inner wall in the region of the recess or borehole or at the outer jacket surface of the holding element and/or of the emission insert.

There is also the possibility that a groove or a flattened portion is conducted, starting from the hollow space, up to and into a region close to the end face of a holding element and/or of an emission insert facing the workpiece so that a radially peripheral, full-area contact is maintained in this region of this end face between the inner wall of the electrode holder and the outer jacket surface of the holding element and/or the inner wall of the holding element and the outer jacket surface of the emission insert at least at normal room temperature and after the insertion of a holding element and/or emission insert into a borehole or recess. A pressure equalization passage formed in this manner is thereby closed at least at room temperature (approx. 20° C.). It can, however, be used at least temporarily for a pressure equalization during the insertion of a holding element and/or of an emission insert temporarily for the pressure equalization since air contained in the hollow space reducing in size during the insertion can successively escape into the environment via a pressure equalization passage formed in this manner over a sufficiently large time period during the insertion and the internal pressure in a hollow space thereby only increases by a negligible amount if at all. The correspondingly temporarily effective pressure equalization passage is only closed briefly before the reaching of the end position of the respective holding element and/or emission insert introduced into a borehole or recess. In this case, it is possible to speak of a pressure equalization passage effective at least temporarily.

With a suitable dimensioning and a selected type of join connection, however, a pressure equalization can take place when the internal pressure subsequently increases as a consequence of heating. In this respect, the contact region between the outer jacket surface of the holding element and/or the emission insert with the inner wall of a borehole or recess, that is, the region in which no groove or flattened portion takes up a correspondingly small area at the end face facing the workpiece at which the respective joining partners (electrode holder, holding element and/or emission insert) are in direct, touching contact with each other and a join connection should be chosen which makes possible an opening for a pressure compensation at increased internal pressure in a hollow space.

If pressure equalization passages are formed between a hollow space at an electrode holder and a hollow space between a holding element and an emission insert, they should be arranged or formed such that they communicate with one another.

With a pressure equalization passage which is formed with a groove or a flattened portion, a contact surface can be observed in the joining region of an emission insert with a holding element or an electrode holder between the outer jacket surface of the emission insert or of the holding element and the inner wall of the holding element or of the electrode holder of at least 90%, preferably of at least 93%, and particularly preferably of at least 96%, of the total surface in the joining region to be able to maintain conditions for the thermal and electrical conductivity which are as good as possible.

A pressure equalization passage can be inclined at an angle with respect to the middle longitudinal axis M, with an inclination angle of a maximum of 45°, preferably of a maximum of 30°, and particularly preferably of a maximum of 15°, having to be observed.

It is the simplest if the pressure equalization passage extends in parallel with the longitudinal axis M.

A groove or a flattened portion which forms a pressure equalization passage can also be of spiral shape, starting from the hollow space, up to the end face of the holding element or of the emission insert facing the workpiece.

A borehole or a recess can be formed, at least in a region starting from the opening, tapering conically and/or with a stepped inner diameter or a free cross-section. An outer jacket surface of the holding element and/or of the emission insert which is to be inserted into such a borehole or recess and should be joined there should be formed complementary thereto.

An outer jacket surface of a holding element and/or of an emission insert can be formed inclined at an angle $\gamma$, $\delta$ in the range 1° to 5°, preferably 1° to 3° with respect to the middle longitudinal axis and/or a chamfer can be formed at an angle $\alpha$ in the range 10° to 40°, preferably 10° to 20° at a radially outer end face edge. This facilitates the assembly on joining.

An elevated portion can be present at a pressure equalization passage formed with a groove at at least one outer margin of the groove which is formed at an outer jacket surface of a holding element and/or of an emission insert. An elevated portion can also be formed along a transition between a groove and an inner wall of the electrode holder or of the holding element. An additional shape-matched connection and a security against rotation can be achieved by such elevated portions.

It is advantageous if the diameter of boreholes or the free cross-section of recesses in the electrode holder and/or holding element as well as the outer diameter(s) of the outer jacket surfaces of the holding element and/or of the emission insert which can be inserted into a borehole or into a recess for joining are selected so that a press fit can be achieved. In this respect, the press fit can be formed solely by suitable dimensioning and material selection with a correspondingly selected force on the pressing in. In addition, however, a different temperature of the joining partners can also be utilized. For instance, a colder holding element can, for example, be introduced into a borehole or recess of a heated electrode holder. This is analogously also possible on joining an emission insert having an electrode holder or a holding element.

The free cross-section of pressure equalization passages should be as small as possible, but sufficiently large for a pressure equalization.

The electrode holder and the holding element can be manufactured from copper or from a copper alloy. A silver alloy is particularly advantageous in this respect. The silver portion can in this respect be selected at at least 50%. The electrode holder and the holding element can be manufactured from the same material.

The invention will be explained in more detail by way of example in the following.

There are shown:

FIG. 1 an example of a plasma cutting torch in a sectional representation;

FIG. 2.1 an electrode holder and an emission insert connected thereto;

FIG. 2.2 an electrode structure with an electrode holder, a holding element and an emission insert;

FIG. 2.3 an electrode structure with an electrode holder, a holding element and an emission insert;

FIG. 2.4 an electrode structure with an electrode holder, a holding element and an emission insert;

FIG. 3.1 an example of an electrode holder which can be used in the invention;

FIG. 3.2 a further example of an electrode holder which can be used in the invention;

FIG. 3.3 a further example of an electrode holder which can be used in the invention;

FIG. 4.1 a holding element with a continuous groove as a pressure equalization passage in a plan view;

FIG. 4.2 the holding element of FIG. 4.1 in a side view;

FIG. 4.3 a further example of a holding element with a non-continuous groove in a plan view;

FIG. 4.4 a further example of a holding element with a non-continuous groove in a side view;

FIG. 5.1 a holding element with a continuous flattened portion in a plan view;

FIG. 5.2 a holding element with a continuous flattened portion in a side view;

FIG. 5.3 a holding element with a non-continuous flattened portion in a plan view;

FIG. 5.4 a holding element with a non-continuous flattened portion in a side view;

FIG. 6.1 a holding element formed with steps and with a continuous groove in a side view;

FIG. 6.2 a holding element formed with steps and with a continuous groove in a plan view;

FIG. 6.3 a holding element formed with steps and with a non-continuous groove and chamfer in a side view;

FIG. 6.4 a holding element formed with steps and with a non-continuous groove and chamfer in a plan view;

FIG. 7.1 a holding element formed with steps and with a continuous flattened portion in a side view;

FIG. 7.2 a holding element formed with steps and with a continuous flattened portion in a plan view;

FIG. 7.3 a holding element formed with steps and conically with a non-continuous flattened portion in a side view;

FIG. 7.4 a holding element formed with steps and conically with a non-continuous flattened portion in a plan view;

FIG. 8.1 a holding element formed with steps and with a continuous flattened portion and a continuous groove in a side view;

FIG. 8.2 a holding element formed with steps and with a continuous flattened portion and a continuous groove in a plan view;

FIG. 8.3 a holding element formed with steps and formed conically at the rear and cylindrically at the front and having a non-continuous flattened portion and a non-continuous groove in a side view;

FIG. 8.4 a holding element formed with steps and formed conically at the rear and cylindrically at the front and having a non-continuous flattened portion and a non-continuous groove in a plan view;

FIG. 9.1 a holding element with a continuous groove inclined toward the middle axis in a side view;

FIG. 9.2 a holding element with a non-continuous groove inclined toward the middle axis M in a side view;

FIG. 10.1 an electrode holder with a groove in an inner borehole surface in a plan view;

FIG. 10.2 an electrode holder with a groove in an inner borehole surface in a sectional side view;

FIG. 10.3 an electrode holder with a groove in an inner borehole surface with a tip in a sectional side view;

FIG. 11.1 an electrode holder with a groove inclined toward the middle axis M in an inner borehole surface in a plan view;

FIG. 11.2 an electrode holder with a groove inclined toward the middle axis M in an inner borehole surface in a sectional side view;

FIG. 11.3 an electrode holder with a groove inclined toward the middle axis M in an inner borehole surface with a tip in a sectional side view;

FIG. 12.1 an emission insert with a non-continuous groove and chamfer in a side view;

FIG. 12.2 an emission insert with a non-continuous groove and chamfer in a plan view;

FIG. 12.3 a conically formed emission insert with a non-continuous groove and chamfer in a side view; and FIGS. 13.1 to 13.5 examples for different groove shapes in holding elements or in an emission insert.

FIG. 1 shows a sectional representation of a plasma cutting torch 1. With a nozzle cap 2, a plasma gas supply 3, a nozzle 4 with a nozzle borehole 4.1, a nozzle holder 5, a receiver for an electrode structure 6 and an electrode structure 7. The electrode structure 7 is formed with an electrode holder 7.1 which has a holding element 7.2 and an emission insert 7.3 connected to the holding element 7.2. Reference numeral 8 designates a nozzle protection cap holder to which a nozzle protection cap 9 is fastened. Secondary gas SG is supplied through the gas conduit 9.1. In addition, a supply for plasma gas PG, the coolant return lines WR1 and WR2 and the coolant feed lines WV1 and WV2 are present at the plasma cutting torch 1.

FIG. 2.1 shows an example of an electrode structure in which a borehole having an opening arranged there is formed in an electrode holder 7.1 at an end face 7.1.1 facing a workpiece. An emission insert 7.3 is inserted into this borehole and a join connection was established with a press fit. As can be seen from the drawing, the emission insert 7.3 is not completely introduced into the borehole so that a hollow space has remained in the end face region of the emission insert 7.3 facing away from the workpiece and within the borehole, with air being able to be or being contained in said hollow space. In this respect, a groove 7.3.3 is formed at the outer jacket surface of the emission insert 7.3 and is formed in this example, starting from the end face of the emission insert 7.3 remote from the workpiece, in parallel with the middle longitudinal axis M in the direction of the end face facing the workpiece. The groove 7.3.3 is, however, not conducted up to the end face of the emission insert 7.3 facing the workpiece so that a radially peripheral contact region is present there when the emission insert 7.3 has been completely introduced into the borehole 7.4 of the electrode holder 7.1.

Accordingly, the pressure equalization passage formed with the groove 7.3.3 can be utilized only temporarily as such on the insertion of the emission insert 7.3 into the borehole 7.4.

FIG. 2.2 shows an example of an electrode structure in which the emission insert 7.3 has been introduced into a borehole 7.2.1 which is formed in a holding element 7.2 and which has been joined to the holding element 7.2 there. A hollow space which is closed in a gas-tight manner by means of the emission insert 7.3 is also present within the borehole 7.2.1 in the holding element 7.2.

Since the holding element 7.2 has also been fixed in an analog manner within a borehole 7.4 which has been formed in the electrode holder 7.1, a hollow space which is closed by the holding element 7.2 in a gas-tight manner can also be present there in the borehole 7.4 formed in the electrode holder 7.1.

In this example, a groove 7.2.3 is formed at the holding element 7.2 from an end face up to the oppositely disposed end face. The pressure equalization passage formed in this manner can also be active after the insertion into the borehole 7.4 and optionally also after the joining if a sufficiently free cross-section of the groove 7.2.3 is kept free over its length.

FIG. 2.3 shows an example of an electrode structure 7 in which the emission insert 7.3 has been introduced into a borehole 7.2.1 which is formed in a holding element 7.2. The holding element 7.2 is in turn introduced into a borehole 7.4 of the electrode holder 7.1 and is connected thereto therein.

In this respect, a respective groove 7.2.3 is conducted at the radially outer jacket surface of the holding element 7.2 and a respective groove 7.3.3 is conducted, as in the example in accordance with FIG. 2.2, from an end face up to the oppositely disposed end face at the radially outer jacket surface of the holding element 7.2. There is thereby the possibility that a pressure equalization is also possible by the pressure equalization passages thus formed after the insertion, and optionally the joining, of the emission insert 7.3 into the borehole 7.2.1 of the holding element 7.2 and of the holding element 7.2 in the borehole 7.4 of the electrode holder 7.1.

The example shown in FIG. 2.4 differs from the example in accordance with FIG. 2.3 in that only one groove 7.2.3 is formed at the radially outer jacket surface of the holding element 7.2 and this groove 7.2.3, as in the example in accordance with FIG. 2.1 for the groove 7.3.3, is not conducted from an end face up to the oppositely disposed end face so that a contact region is present in the region facing the workpiece, said contact region being able to have a sealing effect such that a pressure equalization passage is formed at the holding element 7.2 by the groove 7.2.3 which acts temporarily on the insertion of the holding element 7.2. into the borehole 7.4 of the electrode holder 7.1.

FIGS. 3.1 to 3.3 show examples for boreholes 7.4 which are formed in an electrode holder 7.1 here. In this respect, they are generally so-called blind boreholes which, however, each have different shapes of the end faces 7.1.6 remote from the workpiece. In the example shown in FIG. 3.3, the borehole 7.4 has two steps of different inner diameters D1 and D2. An emission insert 7.3 to be inserted there should be of complementary design and an outer jacket surface should be formed which is likewise formed with two diameter steps and which should correspond to the diameters D1 and D2 and optionally be identical to them.

FIGS. 4.1 and 4.2 show an example of a holding element 7.2 which can be used in the invention in two views. In this respect, the holding element 7.2 again has a borehole 7.2.1 in which an emission insert 7.3 can be fixed. A groove 7.2.3 is formed at the outer jacket surface 7.2.2 of the holding element 7.2 and in turn establishes a connection between the environment and the hollow space in the interior of the borehole 7.4 which is formed as has been explained above such that a pressure equalization passage is formed by the groove 7.2.3. A flattened portion, such as is shown, for example, in FIG. 5.1, can also be used instead of the groove 7.2.3.

The example shown in FIGS. 4.3 and 4.4 differs from the example in accordance with FIGS. 4.1 and 4.2 in that the groove 7.2.3 is not conducted over the total length of the holding element 7.2, that is not completely from the hollow space up to the environment, and in this respect a region is not freely available in which a still full-area contact is present between the inner wall of the electrode holder 7.1 and the outer jacket surface of the holding element 7.2. This region is, however, so short or small that a pressure equalization is possible with an increasing internal pressure in the hollow space on the pressing of the holding element 7.2 into the electrode holder 7.1 (see also FIG. 2.4).

The examples shown in FIGS. 5.1 to 5.4 differ from the examples in accordance with FIGS. 4.1 to 4.4 only in that, instead of a groove 7.2.3, a flattened portion has been formed by simple, areal, planar material removal at the outer jacket surface of the holding element 7.2.

The examples shown in FIGS. 6.1 to 6.4 show holding elements 7.2 in which the outer diameter is formed in two steps with the diameters D4 and D3. In this respect, the diameter D3 is larger than D4 and is arranged at the side facing the workpiece. In FIGS. 6.3 and 6.4, chamfers having an angle α and β are formed at the radially outer edges at the end faces 7.2.4 and 7.2.6.

In addition, a blind borehole 7.2.1 into which an emission insert 7.3 can be introduced and can be fixed therein is again formed in the holding element 7.2. Two grooves 7.2.3 and 7.2.5 are formed at the radially outer jacket surface having the outer diameters D3 and D4 of the holding element for the formation of a pressure equalization passage between a hollow space which is formed in the holding element 7.2 in the end-face region of the borehole 7.2.1 remote from the workpiece and the environment. In a form not shown, such grooves can be formed solely or additionally also at the inner wall of a borehole which is formed in the electrode holder 7.1 for receiving the holding element 7.2.

In the holding elements 7.2 which can be used in the invention and which are shown in FIGS. 7.1 to 7.4, instead of the grooves, flattened portions 7.2.3 and 7.2.5 are present at the outer jacket surfaces 7.2.2 and 7.2.4 for the formation of a pressure equalization passage. A stepped formation with different outer diameters D3 and D4 is again selected. In the example in accordance with FIGS. 7.3 and 7.4, the two steps are additionally formed as conically tapering starting from the side facing the workpiece. In this respect, the cone angles δ and γ were selected. With this configuration, the introduction of the holding element 7.2 into a borehole/recess, which should naturally be complementary to the two diameters and to the conical design, is facilitated and the join between the electrode holder 7.1 and the holding element 7.2 can be achieved more securely.

In the examples for holding elements 7.2 shown in FIGS. 8.1 to 8.4, instead of the grooves, flattened portions 7.2.3 and 7.2.5 are formed at the outer jacket surface of the holding element 7.2. A borehole 7.2.1 for receiving the emission insert 7.3 having the diameter D5 is formed in the interior.

In the example shown in FIGS. 8.3 and 8.4, the region facing the workpiece has the constant outer diameter D3 and is cylindrical. The region remote from the workpiece is in contrast again formed conically tapering with the smallest outer diameter D4 at the end face 7.2.4. The cone angle γ is likewise drawn.

The end face edge which is again provided with a chamfer which has the angle β is formed at the side of the cylindrical region with the diameter D3 remote from the workpiece.

FIGS. 9.1 and 9.2 show examples for holding elements 7.2 in which a groove 7.2.3 for a pressure equalization passage is formed at an angle ϵ with respect to the middle longitudinal axis M and formed over the total length of the holding element 7.2 from an end face surface 7.2.7 up to the end side surface 7.2.8 arranged oppositely disposed. The groove 7.2.3 is in this respect formed at the outer jacket surface of the holding element 7.2. In this respect, FIG. 9.1 shows a continuous groove and FIG. 9.2 a non-continuous groove 7.2.3.

At the radially outer end surface edge of the end surface 7.2.7, a chamfer is formed with an angle α and facilitates the introduction and improves the conditions for a pressure equalization between a hollow space which is arranged above the end side surface 7.2.2 and the environment.

FIGS. 10.1 and 10.2 show one example and FIG. 10.3 shows a further example of an electrode holder 7.1 in different views and in a section. In this respect, a borehole 7.4 open at one side is present in the electrode holder 7.1 for the introduction and fixing therein of an emission insert 7.3. At the inner wall of the borehole 7.4, a groove 7.1.5 is formed which enables the pressure equalization between the hollow space which is formed above the end face of the emission insert 7.3 introduced into the borehole 7.4 remote from the workpiece and the end face 7.1.6 of the borehole 7.4. The borehole 7.4 has the inner diameter D1 and ends flat in FIG. 10.2 and acute in FIG. 10.3. The emission insert 7.3, not shown, should have an outer diameter which is very close at this diameter D1, is identical to it or is even larger than it so that the joining can be achieved with a press fit without additional material where possible.

In FIGS. 11.1 to 11.3, examples of an electrode holder 7.1. are shown which correspond to FIGS. 10.1 to 10.3 in essential points. Only the groove 7.1.5 is inclined at an angle ϵ with respect to the middle longitudinal axis M. The groove 7.1.5 is in this respect moreover formed by way of example not with a constant cross-section over its length, starting from the side remote from the workpiece up to the side facing the workpiece.

In FIGS. 12.1 to 12.2, examples of an emission insert 7.3 are shown which have the outer diameter D6. In the example shown in FIG. 12.1, the emission insert 7.3 is cylindrical with a constant outer diameter D6. A chamfer having the angle α is formed in the end edge region only at the side remote from the workpiece.

A groove 7.3.3 which in this example does not extend completely from an end face 7.3.7 to the oppositely disposed end face 7.3.8 is formed at the outer jacket surface. A small region of the outer jacket surface of the emission insert 7.3 thereby remains in which a radially peripheral contact is present between the outer jacket surface of the emission insert 7.3 and the inner wall of a borehole 7.4 which is formed in an electrode holder 7.1 or a holding element 7.2 and into which the emission insert 7.3 can be introduced. This region directly adjoins the end face 7.3.8 of the emission insert 7.3 facing the workpiece. Since this contact region is, however, very small, a pressure equalization to the environment can nevertheless take place with a corresponding pressure increase on the pressing of the emission insert 7.3 into the electrode holder 7.1 or into the holding element 7.2 in a hollow space which is arranged at the end face 7.3.3 remote from the workpiece. In the example shown in FIG. 12.3, the emission insert 7.3 is formed as conically tapering outwardly in the direction of the side remote from the workpiece with the angle γ and a chamfer having the chamfer angle α is formed at the end side edge of the end side face 7.3.7.

In FIGS. 13.1 to 13.5, a plurality of examples for geometrical designs of grooves or flattened portions 7.2.3, 7.2.5 or 7.3.3 are shown such as can be formed at outer jacket surfaces of a holding element 7.2 or of an emission insert 7.3. In an analog manner, these geometries can, however, also be used with grooves which are formed at inner walls of boreholes 7.4 or 7.2.1.

In the example shown in FIG. 13.5, elevated portions 7.3.9 are formed at the outer edges of groove 7.3.3 and by which a security against rotation and an improved, more secure fixing on joining can be achieved by shape matching of an emission insert 7.3 or of a holding element 7.2 with a holding element 7.2 or an electrode holder 7.1 in a corresponding borehole 7.2.1 or 7.4.

REFERENCE NUMBER LIST

1 plasma torch
2 nozzle cap
3 plasma gas conduit
4 nozzle
4.1 nozzle borehole
5 nozzle holder
6 electrode receiver
7 electrode or electrode structure
7.1 electrode holder
7.1.1 front surface
7.1.2 outer surface
7.1.3 inner surface
7.1.4 inner surface
7.1.5 groove or flattened portion
7.1.6 inner surface
7.2 holding element
7.2.1 borehole
7.2.2 outer surface
7.2.3 groove or flattened portion

7.2.4 outer surface
7.2.5 groove or flattened portion
7.2.6 surface
7.2.7 end face remote from the workpiece
7.2.8 end face facing the workpiece
7.2.9 inner wall
7.2.10 elevated portion
7.2.11 inner surface at the end of the borehole 7.2.1
7.3 emission insert
7.3.2 outer jacket surface
7.3.3 groove or flattened portion
7.3.7 end face remote from the workpiece
7.3.8 end face facing the workpiece
7.3.9 elevated portion between groove and outer surface
7.4 borehole
8 nozzle protection cap holder
9 nozzle protection cap
9.1 secondary gas guide
D1 inner diameter
D2 inner diameter
D3 outer diameter
D4 outer diameter
D5 inner diameter
M middle longitudinal axis
PG plasma gas
SG secondary gas
WR1 coolant return line
WR2 coolant return line
WV1 coolant feed line
WV2 coolant feed line
α angle (chamfer angle)
β angle (chamfer angle)
γ angle (cone angle)
δ angle (cone angle)
ϵ angle

The invention claimed is:

1. An electrode structure for plasma cutting torches, wherein a recess open at one side in the direction of a workpiece to be processed is formed in an electrode holder or in a holding element connected with the electrode holder for receiving an emission insert, in which recess the inserted emission insert can be fastened in one or more of a force transmitting manner, a shape-matching manner or with material continuity, characterized in that, a temporarily active pressure equalization passage is present between a hollow space formed in said recess and the emission insert and the environment through the emission insert and/or between an outer jacket surface region of the emission insert and the inner wall of the recess which is formed in the holding element or in the electrode holder; and/or a temporarily active pressure equalization passage is present between a hollow space formed in a recess and the holding element and the environment through the holding element and/or between an outer jacket surface region of the holding element and the inner wall of the recess which is formed in the electrode holder or in the holding element wherein a groove or flattened portion is conducted, starting from the hollow space, up to and into a region close to the end face of the holding element and/or emission insert facing the workpiece such that in the region of the end face a radially peripheral full-area contact occurs between the inner wall of the electrode holder and the outer jacket surface of the holding element and/or the inner wall of the holding element and the outer jacket surface of the emission insert at least at a normal room temperature.

2. An electrode structure in accordance with claim 1, characterized in that a pressure equalization passage is formed as a groove or as a flattened portion at an outer jacket surface.

3. An electrode structure in accordance with claim 1, characterized in that, with a pressure equalization passage which is formed by a groove or by a flattened portion, a contact surface between the outer jacket surface of the emission insert or of the holding element and the inner wall of the holding element or of the electrode holder is observed in the join region of an emission insert with a holding element or an electrode holder of at least 90%, preferably of at least 93%, and particularly preferably of at least 96% of the total surface in the join region.

4. An electrode structure in accordance with claim 1, characterized in that a pressure equalization passage is in parallel with or is inclined at an angle ϵ with respect to the middle longitudinal axis M, with an inclination angle being observed of a maximum of 45°, preferably of a maximum of 30°, and particularly preferably of a maximum of 15°.

5. An electrode structure in accordance with claim 1, characterized in that a recess is formed in at least one region, starting from the opening, tapering conically and/or with a stepped inner diameter or with a free cross-section and an outer jacket surface of the holding element and/or of the emission insert is formed complementary thereto.

6. An electrode structure in accordance with claim 1, characterized in that an outer jacket surface of a holding element and/or of an emission insert is inclined at an angle γ in the range 1° to 5°, preferably 1° to 3°, with respect to the middle longitudinal axis M and/or a chamfer is formed at a radially outer end face edge having an angle in the range 10° to 40°, preferably 10° to 20°.

7. An electrode structure in accordance with claim 1, characterized in that an elevated portion is present at a pressure equalization passage formed by a groove at at least one outer margin of the groove which is formed at an outer jacket surface of a holding element and/or of an emission insert.

8. An electrode structure in accordance with claim 1, characterized in that an elevated portion is formed along a transition between a groove and an inner wall of a recess of the electrode holder or of the holding element.

9. An electrode structure in accordance with claim 1, characterized in that the diameter of the free cross-section of recesses in the electrode holder and/or in the holding element as well as the outer diameter(s) of the outer jacket surfaces of the holding element and/or of the emission insert, which can be inserted into a recess for joining, are selected such that a press fit can be achieved.

10. An electrode structure for plasma cutting torches, comprising an electrode holder having an electrode holder recess open at one side in the direction of a workpiece to be processed, said electrode holder recess receiving one of an emission insert or a holding element having a holding element recess open at one side in the direction of a workpiece to be processed for receiving an emission insert, in which electrode holder recess and holding element recess, an inserted emission insert can be fastened, wherein at least one temporarily active pressure equalization passage is present between hollow space(s) formed in one or more of said electrode holder recess, said holding element recess, said emission insert, and said holding element, and the environment through one or more of the holding element and emission insert and/or within said electrode holder recess and/or said holding element recess, said temporarily active pressure equalization passage is defined by a groove or flattened portion within said emission insert and/or holding element and extends starting from the hollow space, up to and into a region close to an end face of said holding element and/or emission insert facing the workpiece and ending before said end face such that in the region of the end face, a radially peripheral full-area contact occurs between an inner wall of the electrode holder and an outer jacket surface of the holding element and/or the inner wall of the holding element, and the outer jacket surface of the emission insert, to close the pressure equalization passage upon full insertion of said holding element and emission insert within said recesses.

* * * * *